（12） United States Patent
Kosonocky et al.

(10) Patent No.: US 9,405,357 B2
(45) Date of Patent: Aug. 2, 2016

(54) DISTRIBUTION OF POWER GATING CONTROLS FOR HIERARCHICAL POWER DOMAINS

(71) Applicant: Advanced Micro Devices, Inc., Sunnyvale, CA (US)

(72) Inventors: Stephen V. Kosonocky, Fort Collins, CO (US); Christopher Spence Oliver, Austin, TX (US); Sudha Thiruvengadam, Austin, TX (US); Carson D. Henrion, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 643 days.

(21) Appl. No.: 13/854,434

(22) Filed: Apr. 1, 2013

(65) Prior Publication Data

US 2014/0298068 A1    Oct. 2, 2014

(51) Int. Cl.
*H03L 5/02* (2006.01)
*G06F 1/32* (2006.01)

(52) U.S. Cl.
CPC ........... *G06F 1/3287* (2013.01); *Y02B 60/1282* (2013.01)

(58) Field of Classification Search
CPC ............. G06F 1/3203; H02J 3/14; G11C 5/14
See application file for complete search history.

(56) References Cited

U.S. PATENT DOCUMENTS

| 8,489,906 | B2 * | 7/2013 | Ramaraju | G06F 1/3203 365/185.16 |
| 8,823,209 | B2 * | 9/2014 | Tatsumi | G06F 1/3203 307/39 |

\* cited by examiner

*Primary Examiner* — Kenneth B Wells
*Assistant Examiner* — Rafael Pacheco

(57) ABSTRACT

An integrated circuit device includes a first module disposed within a first power domain, a second module disposed in a second power domain that is a sub-domain of the first power domain, first power gating logic, and second power gating logic. The first power gating logic generates a first virtual power supply for the first module. The second power gating logic is powered by the first virtual power supply for generating a second virtual power supply for the second power domain.

19 Claims, 4 Drawing Sheets

DISTRIBUTION OF POWER GATING CONTROLS FOR HIERARCHICAL POWER DOMAINS

FIELD OF THE DISCLOSURE

The present disclosure relates generally to processors and more particularly to power domain control.

BACKGROUND

Multiple core processors include hierarchical power domains. Portions of the processor not needed to support a current level of activity are placed in a sleep state by powering them down, a technique referred to as power gating. The power domains are hierarchical in the respect that a sub-domain within a parent domain may be separately enabled or disabled while its parent domain is active. However, when the parent domain is power gated, the sub-domain is also power gated.

This ability to selectively power gate components within domains or sub-domains in an integrated circuit device is particularly important in handheld devices including, but not limited to, cell phones, personal digital assistants, portable entertainment systems, etc. In such devices, reducing the net power consumption of the device lengthens the amount of time between charges (or between replacements) of a battery power source. However, it is recognized that the selective ability to switch components on or off in an integrated circuit device is also important to traditional computer systems that are not dependent upon a battery source. For instance, laptops are often designed to dissipate the least amount of heat so that the user is comfortable handling the system. It may further be valuable to selectively power gate components to reduce the net power consumed on a traditional computer system. It is further recognized that the physical size of an integrated circuit device and/or computer system, and the amount of operating noise associated with the device/system, may also decrease as the number and size of heat sinks and fans is reduced.

The logic that controls and distributes the power gating signals is disposed in an always-on domain. An always-on domain is one that is not selectively power gated. This domain retains power at any time the system is powered on, even if some or most of the system components are in a steep state. The components disposed in the always on-domain are ones that are required to control the sleep states of the other domains. Affirmatively controlling the components that determine the power state of power gated domains avoids situations in which the logic signals driving the power gates could become indeterminate when a particular domain or sub-domain is powered down. This arrangement requires the always-on power domain to be physically distributed to the power gating logic within the domain or sub-domain. The distribution of the power and control for the power gating logic leads to increased leakage as the logic is in the always-on domain and cannot be shut off even if the domain and its sub-domains are power gated.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate example techniques for distributing power gating controls for hierarchical power domains. Control logic for power gating of a sub-domain may be distributed to the parent domain as opposed to an always-on power domain. Distributing the power gating logic allows the sub-domain logic to be powered down with the parent domain, thereby reducing leakage.

Figure 1:
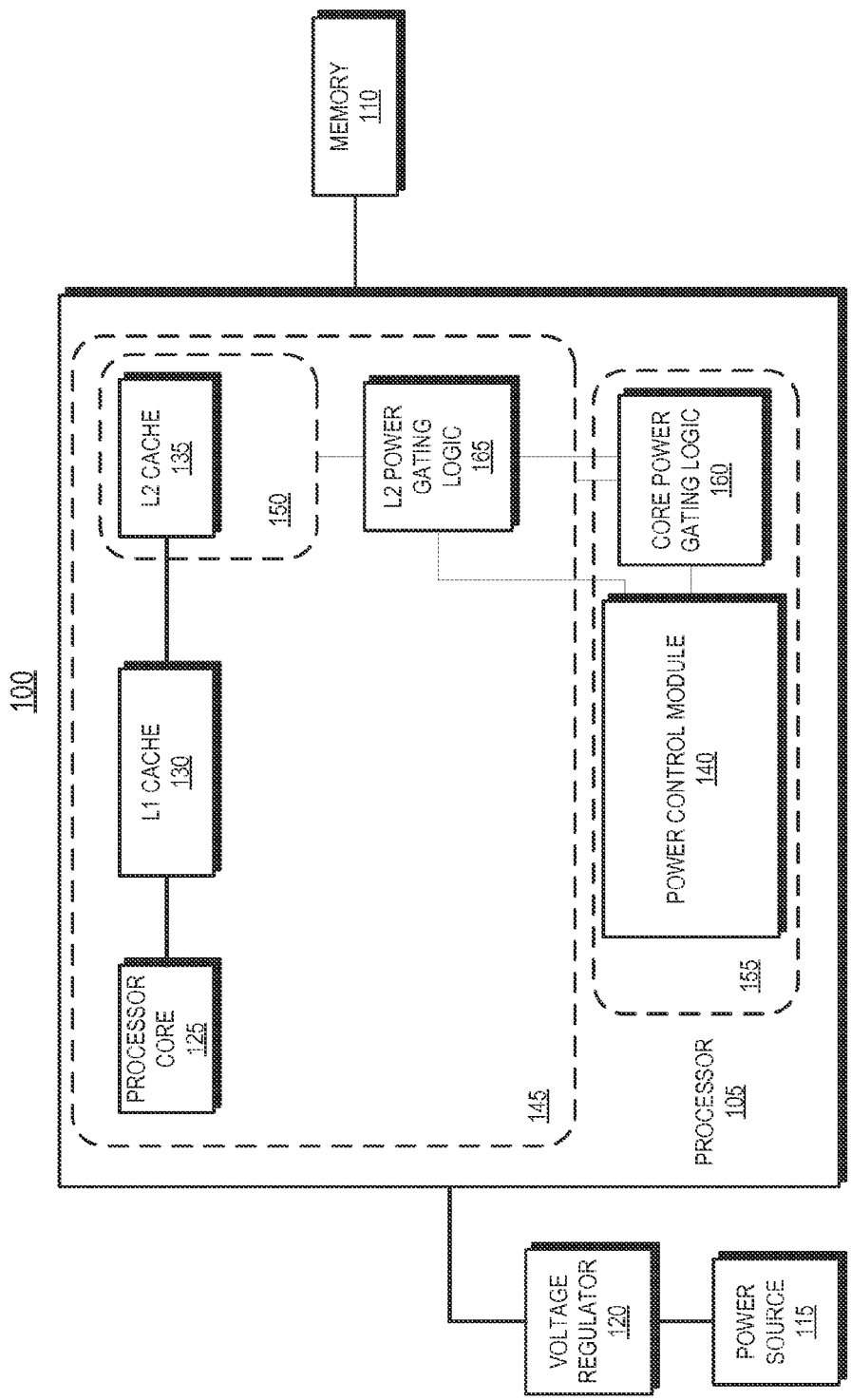
FIG. 1 is a block diagram of a processing system having a hierarchy of power domains in accordance with some embodiments.

FIG. 1 illustrates a processing system 100 having a hierarchy of power domains in accordance with some embodiments. The processing system 100 can be used in any of a variety of electronic devices, such as a personal computer, server, portable electronic device such as a cellular phone or smartphone, a game system, set-top box, and the like. The processing system 100 generally stores and executes instructions organized as computer programs in order to carry out tasks defined by the computer programs, such as data processing, communication with other electronic devices via a network, multimedia playback and recording, execution of computer applications, and the like.

The processing system 100 includes a processor 105, a memory 110, a power source 115, and a voltage regulator 120. The power source 115 can be any source that can provide electrical power, such as a battery, fuel cell, alternating current source (e.g. an electrical outlet or electrical generator), and the like. In some embodiments, the power source 115 also includes modules to regulate the form of the provided electrical power, such as modules to convert an alternating current to direct current. In either scenario, the power source 115 provides the electrical power via an output voltage. The voltage regulator 120 regulates the output voltage to provide a power supply voltage that it maintains with specified limits. The power supply voltage provides power to the processor 105, and can also provide power to other components of the processing system 100, such as the memory 110.

The memory 110 includes one or more storage devices that manipulate electrical energy in order to store and retrieve data. Accordingly, the memory 110 can be random access memory (RAM), hard disk drives, flash memory, and the like, or any combination thereof. The memory 110 is generally configured both to store the instructions to be executed by the processor 105 in the form of computer programs and to store the data that is manipulated by the executing instructions, To facilitate the execution of instructions, the processor 105 includes at least one processor core 125. The processor core 125 includes one or more instruction pipelines to fetch, decode, dispatch, execute, and retire instructions. An operating system (OS) assigns the particular instructions to be executed by the processor core 125. To illustrate, a particular sequence of instructions to be executed by a processor core is referred to as a program thread. A thread can represent either an entire a computer program or a portion thereof assigned to carry out a particular task. For a computer program to be executed, the OS identifies the program threads of the computer program and assigns (schedules) the threads for execution at the processor core 125.

In the course of executing instructions, the processor core 125 stores and retrieves data from a memory hierarchy that includes the memory 110 and one or more caches, including a level 1 (L1) cache 130 and a level 2 cache 135. The levels of the caches 130, 135 indicate their relative its position in the memory hierarchy, with the L1 cache 130 representing the highest level, the L2 cache 135 the next-lower level, and the memory 110 representing the lowest level. In the illustrated example, the L1 and L2 caches 130, 135 are associated with the single processor core 125. In some embodiments, the processor 105 may include multiple processor cores, and one or more caches may be shared by the multiple cores. For example, the L2 cache 135 may be shared by one or more cores, such that the L2 cache 135 can store and retrieve data on behalf of any of the processor cores.

The memory hierarchy is configured to store data in a hierarchical fashion, such that the lowest level (the memory 110) stores all system data, and other levels store a subset of the system data. The processor core 125 accesses (i.e., reads or writes) data in the memory hierarchy via memory access operations, whereby each memory access operation indicates a memory address of the data to be accessed. In the event that a particular level of the memory hierarchy does not store data associated with the memory address of a received memory access, it requests the data from the next-lower level of the memory hierarchy. In this fashion, data traverses the memory hierarchy, such that the L1 cache 130 stores the data most recently requested by the processor core 125.

In some operating situations, the processor core 125 may not have any processing tasks to complete. Accordingly, to conserve power, the processing system 100 includes a power control module 140 that controls the power supplied individually to various power domains in the processor 105 so that idle components may be powered down. The power control module 140 selectively couples and decouples the voltage supplied b the voltage regulator 120 to the various power domains. Exemplary power domains include a core power domain 145, a L2 cache power domain 150, and an always-on domain 155. An always-on domain is one that is not selectively power gated. This domain retains power at any time the system is powered on, even if some or most of the system components are in a sleep state. The components disposed in the always on-domain are ones that are required to control the sleep states of the other domains. The power control module 140 is located within the always-on domain 155 to provide signals to control the power states of the other power domains 145, 150. The hierarchy of power domains may vary depending on the particular architecture of the processor 105. For example, a multi-core processor may have separate power domains for each core and its associated L1 cache, and a separate power domain for a shared L2 cache. The L2 cache may be power gated if all of its associated cores are also power gated.

The processor core 125 may be power gated depending on the processing demands on the processor 105. In some embodiments, the L1 and L2 caches 130, 135 are part of the core power domain 145, so if the processor core 125 is power gated, so too are its associated L1 and L2 caches 130, 135. Prior to power gating the core power domain 145, the contents of the associated caches 130, 135 are flushed to the memory 110. In some situations, if the processing load is light, the processor core 125 may remain operational, but the L2 cache 135 may be power gated to conserve power. The L1 cache 130 may then be the only cache operating for the processor core 125. The L2 cache power domain 150 is a sub-domain of the core power domain 145, as it may be selectively power gated while the core power domain 145 is operational, but is power gated if the parent domain is power gated.

The power control module 140 sends signals to core power gating logic 160 (e.g., control logic) to generate a core virtual voltage generated for the core power domain 145 and to L2 power gating logic 165 (e.g., control logic) to generate a L2 cache virtual voltage for the cache power domain 150. The power control module 140 may control the L2 power gating logic 165 directly or through the core power gating logic 160.

Figure 2:
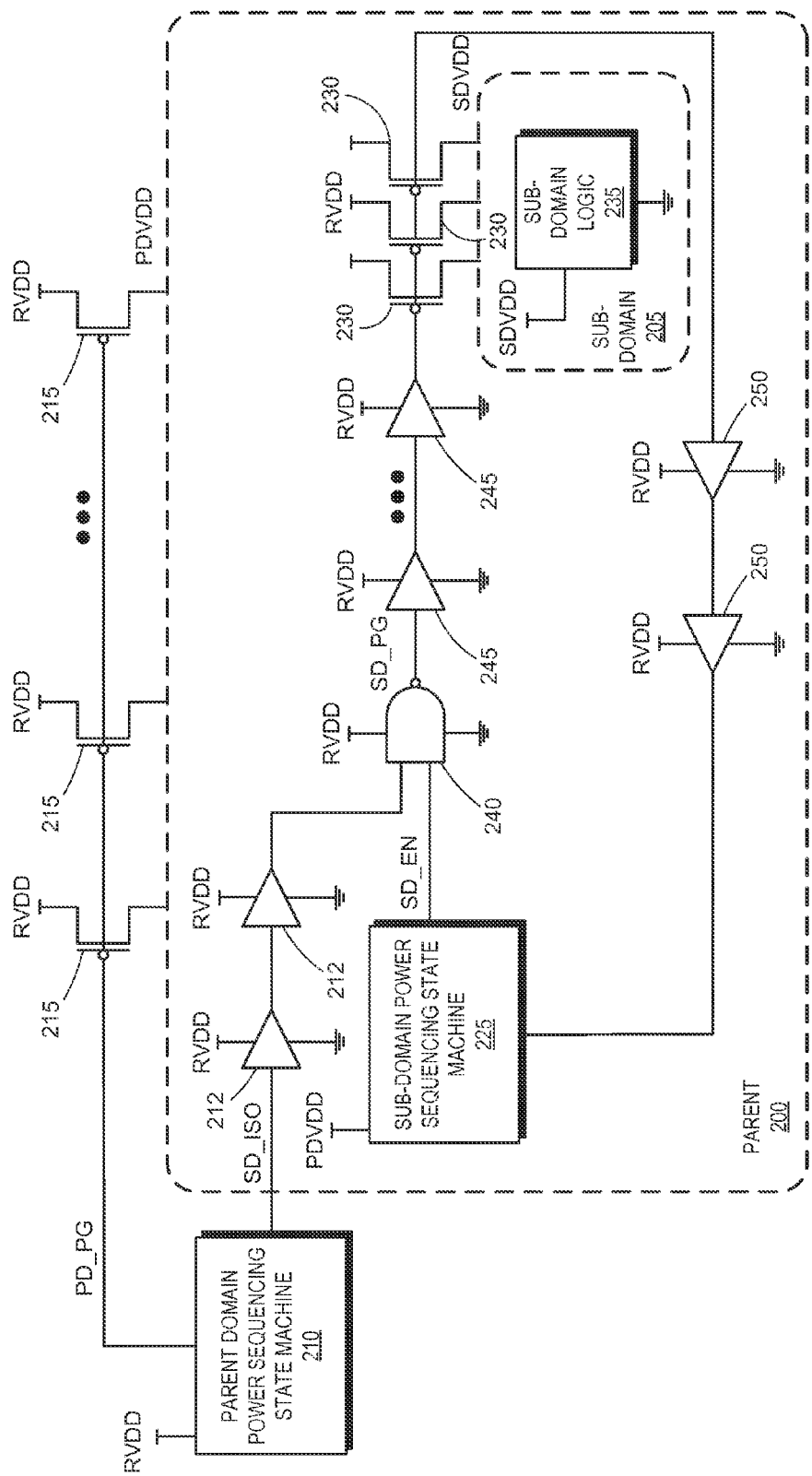
FIG. 2 is a block diagram illustrating how power gating is implemented for a parent domain and a sub-domain in the hierarchy of power domains in accordance with some embodiments.

FIG. 2 is a block diagram illustrating how power gating is implemented for a parent power domain 200 and a sub-domain 205 in the hierarchy of power domains in accordance with some embodiments. In the illustrated example, the parent power domain 200 may be the core power domain 145 and the sub-domain 205 may be the L2 cache power domain 150. In some embodiments, the parent domain may be a sub-domain of a higher level domain in the hierarchy. For example, an L2 cache may have different sections that can be separately power gated to change the size of the L2 cache according to the demands placed on it. A portion of the L2 cache may be a sub-domain of the overall L2 cache parent domain, while the L2 cache may itself be a sub-domain of the core power domain 145.

A parent domain power sequencing state machine 210 (e.g., the core power gating logic 160) controls a plurality of power gating transistors 215 for generating a virtual power supply voltage, PDVDD, for the parent power domain 200. A virtual power supply voltage refers to a secondary power supply voltage that is generated from the output of the voltage regulator 120 to power a power domain or sub-domain. The always-on domain 155 is powered by the voltage regulator 120 without intervening power gating transistors. The power supply voltage for always-on domain 155 may be referred to as a real power supply voltage, while the power supplies generated by power gating transistors are referred to as virtual power supply voltages. The parent domain power sequencing state machine 210 and the power gating transistors 215 are disposed in the always-on domain 220 to ensure reliable control signals to avoid unintentional powering of components in the parent power domain 200, thereby causing leakage. To reduce the magnitude of the current fluctuation and to reduce noise, the parent domain power sequencing state machine 210 may stagger the enablement of the power gating transistors 215 using a cascaded enable signal or multiple enable signals.

A sub-domain power sequencing state machine 225 performs a similar function for the sub-domain power domain 205 by selectively enabling power gating transistors 230 to generate a virtual sub-domain voltage, SDVDD, for powering sub-domain logic 235. The sub-domain power sequencing state machine 225 is located in the parent power domain 200, such that when the parent power domain 200 is power gated by the parent domain power sequencing state machine 210, the sub-domain power sequencing state machine 225 cannot generate logic signals for preventing the unintentional enabling of the power gating transistors 230 and causing leakage in the sub-domain logic 235.

To prevent unintentional enabling of the power gating transistors 230, the parent domain power sequencing state machine 210 generates a first sub-domain enable signal (SD_ISO—isolate low, enable high) that is propagated through buffers 212 and logically combined with a second sub-domain enable signal (SD_EN—enable high) from the sub-domain power sequencing state machine 225 in a logic gate 240. Thus, if the enable signal is removed by either the parent domain power sequencing state machine 210 or the sub-domain power sequencing state machine 225, the power gating transistors 230 are maintained in an off state. Buffers 245 propagate the combined enable signal, SD_PG, from the logic gate 240 to the power gating transistors 230. The logic gate 240 and the buffers 245 are powered by the RVDD voltage from the always-on domain 220, so the power state is always affirmatively controlled. Return buffers 250 return the enable signal to the sub-domain power sequencing state machine 225 so that it may receive feedback regarding the power state of the sub-domain power domain 205.

When the parent power domain 200 is powered, the sub-domain power sequencing state machine 225 controls the state of the sub-domain power domain 205. It power gates the sub-domain power domain 205 by removing its enable signal from the logic gate 240. If the parent power domain 200 is subsequently power gated, the parent domain power sequencing state machine 210 removes its enable signal from the logic gate 240 when disabling the power gating transistors 215 and removing the PDVDD supply. In this manner, the signal that isolates the power gating transistors 230 is maintained while the sub-domain power sequencing state machine 225 is powered down and unable to control the power gating transistors 230.

Figure 3:
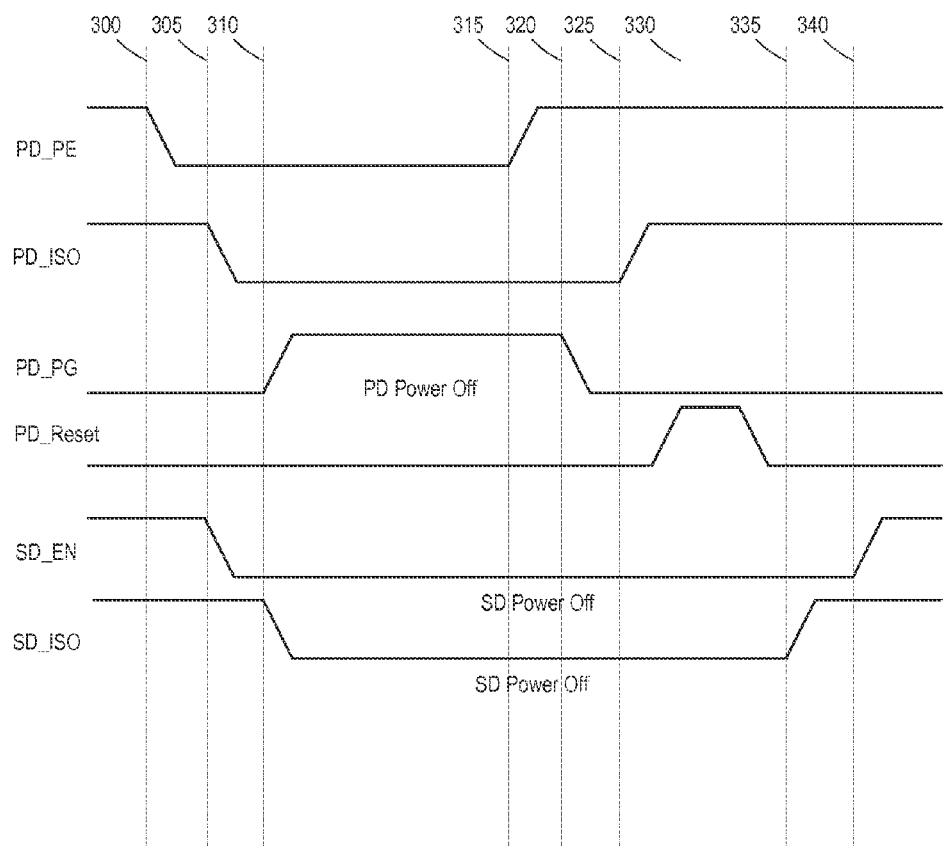
FIG. 3 is a timing diagram illustrating the control signals for implementing power gating in the circuit of FIG. 2 in accordance with some embodiments.

FIG. 3 is a timing diagram illustrating the transitioning of the power domains 200, 205. A parent domain enable signal, PD_PE, represents the desired power state of the parent power domain 200. For example, the power control module 140 may generate the PD_PE signal to indicate the desired power status of the core power domain 145. The PD_PE signal is de-asserted at event 300 to indicate a transition to a sleep state. A parent domain isolation signal, PD_ISO, is asserted when the outputs of the parent domain are valid and de-asserted when they are not valid. For example, the power control module 140 may de-assert the PD_ISO signal at event 305 so that other entities in the system do not rely on the logic values of the outputs of the core 125 during the power transition.

A parent domain power gate signal, PD_PG, is generated by the parent domain power sequencing state machine 210 to control the power gating transistors 215 that generate the parent domain virtual voltage, PDVDD. The PD_PG signal is de-asserted at event 310 to power down the PDVDD supply. The sub-domain power sequencing state machine 225 de-asserts the SD_EN signal at event 305 to de-assert the SD_PG signal controlling the power gating transistors 230 responsive to the removal of the PD_PE signal at event 300. The parent domain power sequencing state machine 210 generates the SD_ISO signal at event 310 to ensure that the SD_PG signal remains de-asserted while the parent domain is power gated.

The PD_PE signal is re-established at event 315 to begin the transition of the parent power domain 200 out of the power gated state. The PD_PG signal is asserted at event 320 by the parent domain power sequencing state machine 210 to restore power to the parent power domain 200. The PD_ISO signal is removed at event 325 and a parent domain reset signal, PD_Reset, is generated at event 330 to reset the logic of the parent domain. Following the reset, the parent domain power sequencing state machine 210 de-asserts the SD_ISO signal at event 335, and the sub-domain power sequencing state machine 225 asserts the SD_EN signal at event 340 to restore power to the sub-domain power domain 205 and provide the virtual power supply, SDVDD, for the sub-domain logic 235.

Because the sub-domain power sequencing state machine 225 is located in the parent power domain 200 the overall power consumption is reduced because the sub-domain power sequencing state machine 225 can be powered down with the parent power domain 200. The sub-domain power sequencing state machine 225 controls the state of the SD_PG signal while the parent power domain 200 is powered up using the SD_EN signal, and the parent domain power sequencing state machine 210 controls the state of the SD_PG signal via the SD_ISO signal when the parent power domain 200 is power gated. Thus, the power gating state of the sub-domain power domain 205 is controlled to avoid leakage during power transitions.

Figure 4:
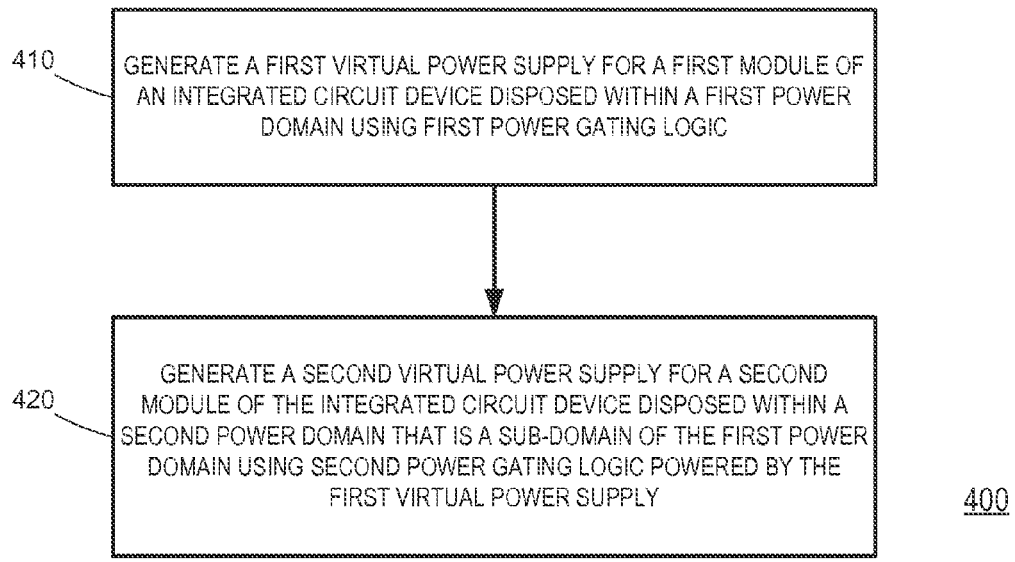
FIG. 4 is a simplified flow diagram of a method for controlling the power state of a sub-domain in a system having hierarchical power domains in accordance with some embodiments.

FIG. 4 is a simplified flow diagram of a method 400 for controlling the power state of a sub-domain in a system having hierarchical power domains. In method block 410, a first virtual power supply is generated for a first module of an integrated circuit device disposed within a first power domain using first power gating logic. In method block 420, a second virtual power supply is generated for a second module of the integrated circuit device disposed within a second power domain that is a sub-domain of the first power domain using second power gating logic powered by the first virtual power supply.

In some embodiments, the apparatus and techniques described above are implemented in a system comprising one or more integrated circuit (IC) devices (also referred to as integrated circuit packages or microchips), such as the processor described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
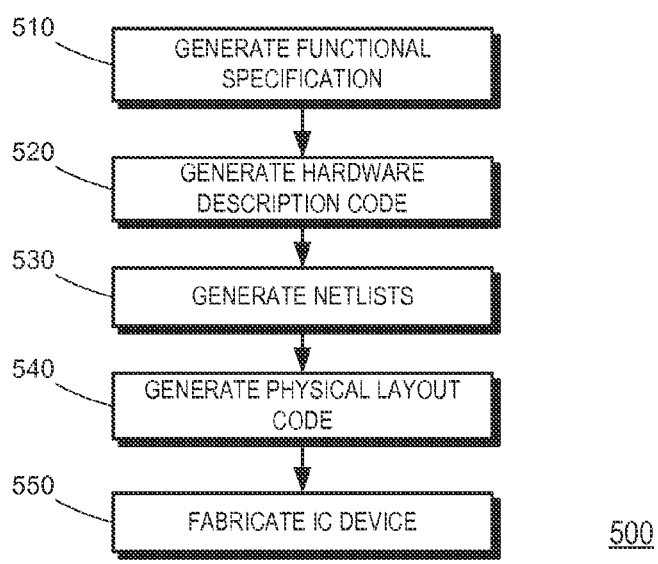
FIG. 5 is a flow diagram illustrating an example method for the design and fabrication of an IC device implementing one or more aspects in accordance with some embodiments.

FIG. 5 is a flow diagram illustrating an example method 500 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 510 a functional specification for the IC device is generated. The functional specification (often referred to as a micro architecture specification (MAS)) may be represented by any of a variety of programming languages or modeling languages, including C, C++, SystemC, Simulink, or MATLAB.

At block 520, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, a synthesis tool is used to synthesize the hardware description code to generate code representing or defining an initial physical implementation of the circuitry of the IC device at block 530. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 540, one or more EDA tools use the netlists produced at block 530 to generate code representing the physical layout of the circuitry of the IC device. This process can include, for example, a placement tool using the netlists to determine or the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 550, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

According to some embodiments, an integrated circuit device includes a first module disposed within a first power domain, a second module disposed in a second power domain that is a sub-domain of the first power domain, first power gating logic, and second power gating logic. The first power gating logic generates a first virtual power supply for the first module. The second power gating logic is powered by the first virtual power supply for generating a second virtual power supply for the second power domain.

According to some embodiments, a method includes generating a first virtual power supply for a first module of an integrated circuit device disposed within a first power domain using first power gating logic. A second virtual power supply is generated for a second module of the integrated circuit device disposed within a second power domain that is a sub-domain of the first power domain using second power gating logic powered by the first virtual power supply.

According to some embodiments, a computer readable medium stores code to adapt at least one computer system to perform a portion of a process to fabricate at least part of an integrated circuit device. The device includes a first module disposed within a first power domain and a second module disposed in a second power domain that is a sub-domain of the first power domain. First power gating logic generates a first virtual power supply for the first module, and second power gating logic powered by the first virtual power supply generates a second virtual power supply for the second power domain.

In some embodiments, certain aspects of the techniques described above may implemented by one or more processors of a processing system executing software. The software comprises one or more sets of executable instructions stored on a computer readable medium that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An integrated circuit device, comprising:
a first module disposed within a first power domain;
a second module disposed in a second power domain, wherein the second power domain is a sub-domain of the first power domain;
first power gating logic for generating a first virtual power supply for the first module;
second power gating logic powered by the first virtual power supply for generating a second virtual power supply for the second power domain: and
at least one first power gating transistor coupled to an always-on power supply, wherein the first power gating logic is operable to enable the at least one first power gating transistor to generate the first virtual power supply by asserting a first power gating signal and de-assert the first power gating signal to disable the at least one first power gating transistor to power down the first power domain and the second power gating logic.

2. The device of claim 1, further comprising a power control module operable to control the first power gating logic to power down the first power domain and the second power gating logic.

3. The device of claim 1, wherein the first power gating logic further comprises a state machine.

4. The device of claim 1, further comprising:
at least one second power gating transistor coupled to the always-on power supply, wherein the second power gating logic is operable assert a second power gating signal to enable the at least one second power gating transistor to generate the second virtual power supply and de-assert the second power gating signal to disable the at least one second power gating transistor to power down the second power domain.

5. The device of claim 4, further comprising logic powered by the always-on power supply and operable to generate an isolation signal to disable the at least one second power gating transistor during a time period in which the at least one second power gating transistor is disabled.

6. The device of claim 5, further comprising a logic gate operable to combine the second power gating signal and the isolation signal to generate an enable signal for the at least one second power gating transistor.

7. The device of claim 5, wherein the logic comprises the first power gating logic.

8. A method, comprising:
generating a first virtual power supply for a first module of an integrated circuit device disposed within a first power domain using first power gating logic;
generating a second virtual power supply for a second module of the integrated circuit device disposed within a second power domain using second power gating logic powered by the first virtual power supply, wherein the second power domain is a sub-domain of the first power domain;
asserting a first power gating signal using the first power gating logic to enable at least one first power gating transistor coupled to an always-on power supply to generate the first virtual power supply; and
de-asserting the first power gating signal to disable the at least one first power gating transistor to power down the first power domain and the second power gating logic.

9. The method of claim 8, further comprising:
powering down the first power domain and the second power gating logic; and
maintaining the second power domain in a powered down state.

10. The method of claim 8, wherein maintaining the second power domain in the powered down state further comprises generating an isolation signal for the second power domain while the first power domain is powered down.

11. The method of claim 8, wherein the integrated circuit device comprises at least one second power gating transistor coupled to the always-on power supply, and the method further comprises:
asserting a second power gating signal using the second power gating logic to enable the at least one second power gating transistor to generate the second virtual power supply.

12. The method of claim 11, further comprising generating an isolation signal to disable the at least one second power gating transistor during a time period in which the at least one first power gating transistor is disabled.

13. The method of claim 12, further comprising logically combining the second power gating signal and the isolation signal to generate an enable signal for the at least one second power gating transistor.

14. A processor, comprising:
a processing core disposed in a core power domain;
a cache disposed in a cache power domain within the core power domain;
core power gating logic for generating a first virtual power supply for the core power domain;
cache power gating logic powered by the first virtual power supply for generating a second virtual power supply for the cache: and
a power control module operable to control the core power gating logic to power down the core power domain and the cache power gating logic.

15. The processor of claim 14, further comprising:
at least one first power gating transistor coupled to an always-on power supply, wherein the core power gating logic is operable to enable the at least one first power gating transistor to generate the first virtual power supply by asserting a first power gating signal and de-assert the first power gating signal to disable the at least one first power gating transistor to power down the core power domain and the cache power gating logic; and
at least one second power gating transistor coupled to the always-on power supply, wherein the second power gating logic is operable assert a second power gating signal to enable the at least one second power gating transistor to generate the second virtual power supply and de-assert the second power gating signal to disable the at least one second power gating transistor to power down the cache power domain.

16. The processor of claim 15, further comprising logic powered by the always-on power supply and operable to generate an isolation signal to disable the at least one second power gating transistor during a time period in which the core power domain and the cache power gating logic are powered down.

17. The processor of claim 16, further comprising a logic gate operable to combine the second power gating signal and the isolation signal to generate an enable signal for the at least one second power gating transistor.

18. The processor of claim 16, wherein the logic comprises the core power gating logic.

19. An integrated circuit device, comprising:
   a first module disposed within a first power domain;
   a second module disposed in a second power domain, wherein the second power domain is a sub-domain of the first power domain;
   first power gating logic for generating a first virtual power supply for the first module responsive to an assertion of a first power enable signal; and
   second power gating logic powered by the first virtual power supply for generating a second virtual power supply for the second power domain, the second power gating logic comprising:
      at least one pull-up transistor having a first terminal coupled to the first virtual power supply and a second terminal coupled to the second power domain; and
      logic to provide a delayed asserted second power enable signal to a gate terminal of each pull-up transistor responsive to the assertion of the first power enable signal.

\* \* \* \* \*